US012359321B2

(12) United States Patent
Tsai et al.

(10) Patent No.: US 12,359,321 B2
(45) Date of Patent: Jul. 15, 2025

(54) STRIPPER COMPOSITION AND CLEANING METHOD

(71) Applicant: Electronic Solutions Technology Taiwan Ltd., Hsinchu County (TW)

(72) Inventors: Wen-Tsai Tsai, Hsinchu County (TW); Kai-Hsuan Chang, Hsinchu County (TW)

(73) Assignee: Electronic Solutions Technology Taiwan Ltd., Hsinchu County (TW)

( * ) Notice: Subject to any disclaimer, the term of this patent is extended or adjusted under 35 U.S.C. 154(b) by 0 days.

(21) Appl. No.: 18/363,767

(22) Filed: Aug. 2, 2023

(65) Prior Publication Data

US 2024/0309516 A1 Sep. 19, 2024

(30) Foreign Application Priority Data

Mar. 13, 2023 (TW) ................................ 112109226

(51) Int. Cl.

| | |
|---|---|
| ***C11D 1/04*** | (2006.01) |
| ***C11D 3/20*** | (2006.01) |
| ***C11D 3/26*** | (2006.01) |
| ***C11D 3/28*** | (2006.01) |
| ***C11D 3/30*** | (2006.01) |
| ***C11D 3/34*** | (2006.01) |
| ***C11D 3/43*** | (2006.01) |
| ***C23G 1/14*** | (2006.01) |

(52) U.S. Cl.
CPC .................. *C23G 1/14* (2013.01); *C11D 1/04* (2013.01); *C11D 3/2006* (2013.01); *C11D 3/2068* (2013.01); *C11D 3/2079* (2013.01); *C11D 3/26* (2013.01); *C11D 3/28* (2013.01); *C11D 3/30* (2013.01); *C11D 3/34* (2013.01)

(58) Field of Classification Search
CPC ....... C11D 1/04; C11D 3/2079; C11D 3/2068; C11D 3/2006; C11D 3/26; C11D 3/28; C11D 3/30; C11D 3/34
USPC ....... 510/175, 176, 477, 488, 499, 500, 504, 510/505, 506
See application file for complete search history.

(56) References Cited

U.S. PATENT DOCUMENTS 5,102,777 A * 4/1992 Lin ......................... G03F 7/425 134/2
5,972,862 A * 10/1999 Torii ....................... G03F 7/425 510/253
7,947,130 B2 * 5/2011 Lee ................... H01L 21/02057 134/28

(Continued)

FOREIGN PATENT DOCUMENTS

CN 104635439 5/2015
EP 2281867 A1 * 2/2011 ......... C11D 11/0047

(Continued)

OTHER PUBLICATIONS

"Office Action of Taiwan Counterpart Application", issued on Dec. 12, 2023, pp. 1-7.

*Primary Examiner* — Gregory R Del Cotto
(74) *Attorney, Agent, or Firm* — JCIPRNET

(57) ABSTRACT

A stripper composition and a cleaning method are provided. The stripper composition includes an amine-based compound (A), a fatty acid (B) and a solvent (C). Based on a total usage amount of 100 wt % of the stripper composition, a usage amount of water is 1 wt % or less.

6 Claims, 6 Drawing Sheets

(56) References Cited

U.S. PATENT DOCUMENTS

| | | | | |
|---|---|---|---|---|
| 2004/0152608 | A1* | 8/2004 | Hsu | G03F 7/425 257/E21.256 |
| 2006/0115970 | A1* | 6/2006 | Lee | C11D 7/3209 257/E21.255 |
| 2010/0105595 | A1* | 4/2010 | Lee | H01L 21/02063 510/176 |
| 2012/0077132 | A1* | 3/2012 | Quillen | H01L 21/02057 430/329 |
| 2013/0035272 | A1* | 2/2013 | Lee | G03F 7/425 510/176 |
| 2014/0100151 | A1* | 4/2014 | Egbe | C11D 7/06 510/176 |

FOREIGN PATENT DOCUMENTS

| | | | | |
|---|---|---|---|---|
| EP | 3480288 | A1 * | 5/2019 | C11D 11/0047 |
| EP | 3599634 | A1 * | 1/2020 | B08B 3/04 |
| TW | 200700549 | | 1/2007 | |
| TW | I273355 | | 2/2007 | |
| TW | 200715073 | | 4/2007 | |
| TW | 201039074 | | 11/2010 | |
| TW | I421650 | | 1/2014 | |
| TW | I450052 | | 8/2014 | |
| TW | I545190 | | 8/2016 | |
| WO | WO-2005001889 | A2 * | 1/2005 | A61K 47/6923 |
| WO | WO-2009058278 | A1 * | 5/2009 | C11D 11/0047 |
| WO | WO-2013136318 | A1 * | 9/2013 | C11D 11/0047 |

* cited by examiner

STRIPPER COMPOSITION AND CLEANING METHOD

CROSS-REFERENCE TO RELATED APPLICATION

This application claims the priority benefit of Taiwan application no. 112109226, filed on Mar. 13, 2023. The entirety of the above-mentioned patent application is hereby incorporated by reference herein and made a part of this specification.

BACKGROUND

Technical Field

The invention relates to a stripper composition, and more particularly, to a stripper composition and a cleaning method.

Description of Related Art

The current stripper composition usually includes hydroxylamine (HDA), and cleans a metal surface by dissociating the hydroxyl group. However, this stripper composition will corrode the metal surface during the process of cleaning the metal surface, thereby affecting the performance of semiconductor devices manufactured using thereof. Therefore, a solution that may solve the aforementioned problems is urgently in need.

SUMMARY

Accordingly, the invention provides a stripper composition and a cleaning method that may clean the metal surface and the oxide surface well without corroding the metal surface.

A stripper composition of the invention includes an amine-based compound (A), a fatty acid (B) and a solvent (C). Based on a total usage amount of 100 wt % of the stripper composition, a usage amount of water is 1 wt % or less.

In an embodiment of the invention, the amine-based compound (A) includes an alcohol amine-based compound, an alcohol ether amine-based compound, an ether amine-based compound, or a combination thereof.

In an embodiment of the invention, based on a total usage amount of 100 wt % of the stripper composition, a usage amount of the amine-based compound (A) is 0.5 wt % to 55 wt %.

In an embodiment of the invention, the fatty acid (B) includes hexanoic acid, octanoic acid, lauric acid, oleic acid, myristic acid, palmitic acid, decanoic acid, or a combination thereof.

In an embodiment of the invention, the solvent (C) includes water, an alcohol-based compound, an alcohol ether-based compound, or a combination thereof.

In an embodiment of the invention, the stripper composition further includes a quaternary ammonium compound (D). Based on a total usage amount of 100 wt % of the stripper composition, a usage amount of the quaternary ammonium compound (D) is 0.5 wt % to 15 wt %.

In an embodiment of the invention, the stripper composition further includes a quaternary ammonium compound (D). The quaternary ammonium compound (D) includes a quaternary ammonium hydroxide compound, a quaternary ammonium halide compound, or a combination thereof.

In an embodiment of the invention, a ratio of a usage amount of the quaternary ammonium compound (D) to a usage amount of the amine-based compound (A) is 1:1 to 1:20.

In an embodiment of the invention, based on a total usage amount of 100 wt % of the stripper composition, a usage amount of the fatty acid (B) is 0.1 wt % to 5 wt %, a usage amount of the solvent (C) is 60 wt % to 97 wt %.

In an embodiment of the invention, a pH value of the stripper composition is 10 or more.

A cleaning method of the invention includes using the stripper composition above to clean and remove a residue or film adhering on a metal surface and/or an oxide surface.

Based on above, the stripper composition of the invention includes an amine-based compound (A), a fatty acid (B) and a solvent (C), and based on a total usage amount of 100 wt % of the stripper composition, a usage amount of water is 1 wt % or less. Thus, the stripper composition used for surface cleaning cleans the metal surface and the oxide surface well without corroding the metal surface, thereby suitable for manufacturing a semiconductor device.

In order to make the aforementioned features and advantages of the disclosure more comprehensible, embodiments with figures are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

<Stripper Composition>

Figure 1A:
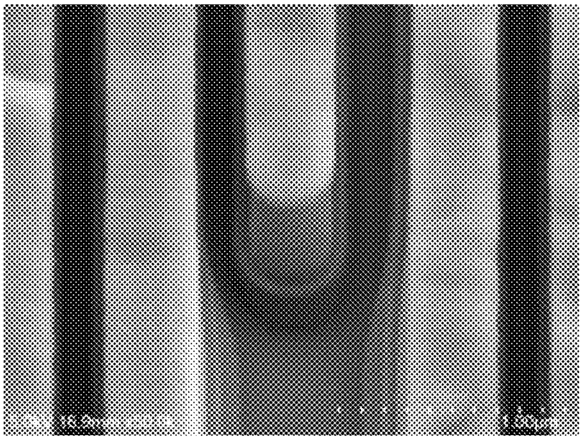
FIG. 1A is a scanning electron microscope (SEM) image obtained after cleaning a metal surface with the stripper composition according to Example 1 of the invention.
Figure 1B:
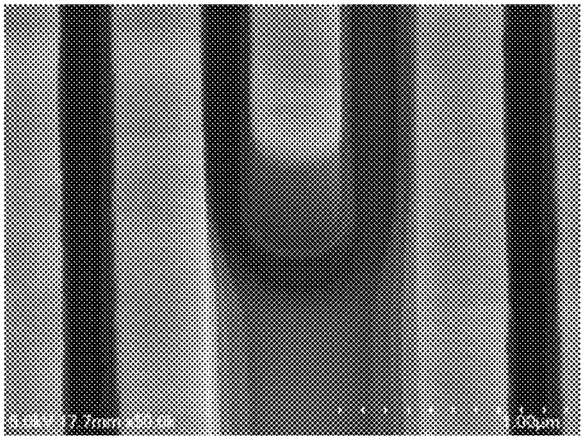
FIG. 1B is a scanning electron microscope image obtained after cleaning a metal surface with the stripper composition according to Example 2 of the invention.
Figure 1C:
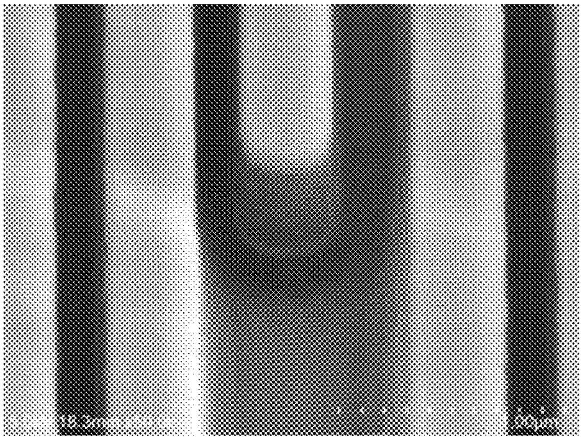
FIG. 1C is a scanning electron microscope image obtained after cleaning a metal surface with the stripper composition according to Example 3 of the invention.
Figure 1D:
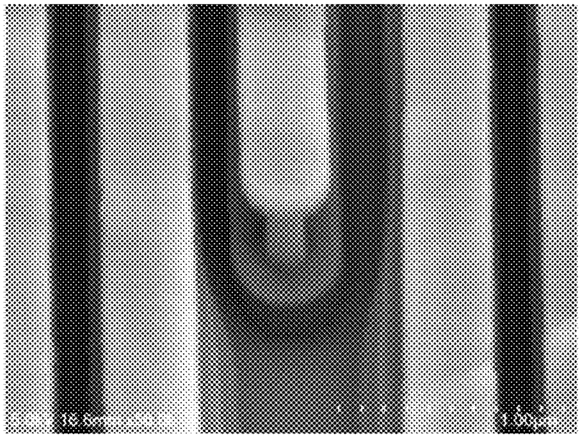
FIG. 1D is a scanning electron microscope image obtained after cleaning a metal surface with the stripper composition according to Comparative example 1 of the invention.
Figure 2A:
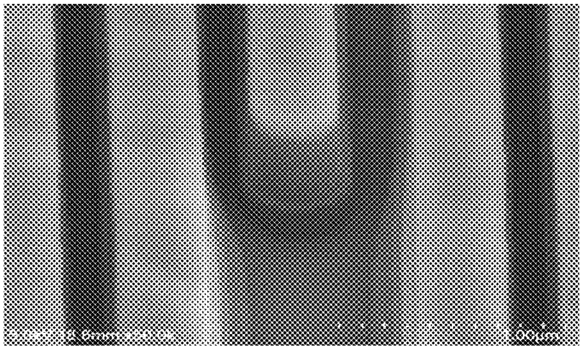
FIG. 2A is a scanning electron microscope image obtained after cleaning a metal surface with the stripper composition according to Example 4 of the invention.
Figure 2B:
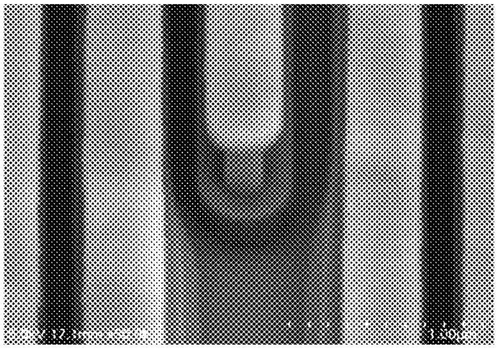
FIG. 2B is a scanning electron microscope image obtained after cleaning a metal surface with the stripper composition according to Comparative example 2 of the invention.
Figure 3A:
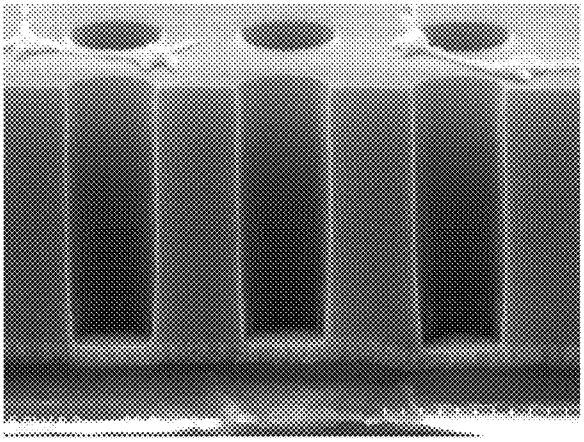
FIG. 3A is a scanning electron microscope image obtained after cleaning an oxide surface with the stripper composition according to Example 5 of the invention.
Figure 3B:
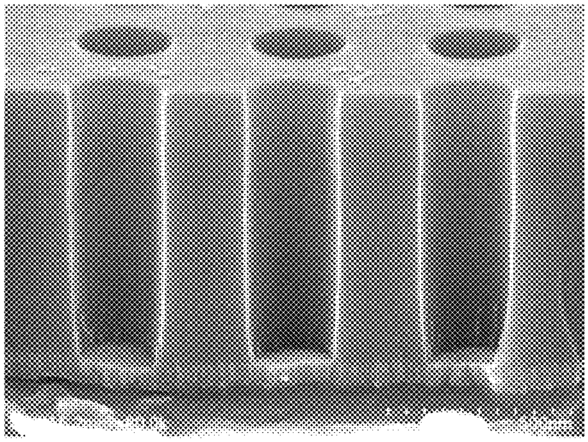
FIG. 3B is a scanning electron microscope image obtained after cleaning an oxide surface with the stripper composition according to Example 6 of the invention.
Figure 3C:
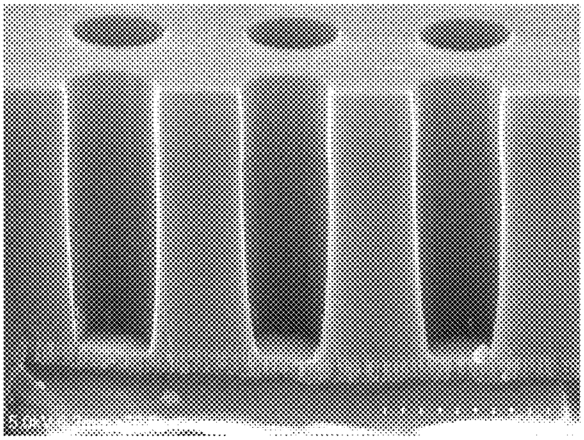
FIG. 3C is a scanning electron microscope image obtained after cleaning an oxide surface with the stripper composition according to Example 7 of the invention.
Figure 3D:
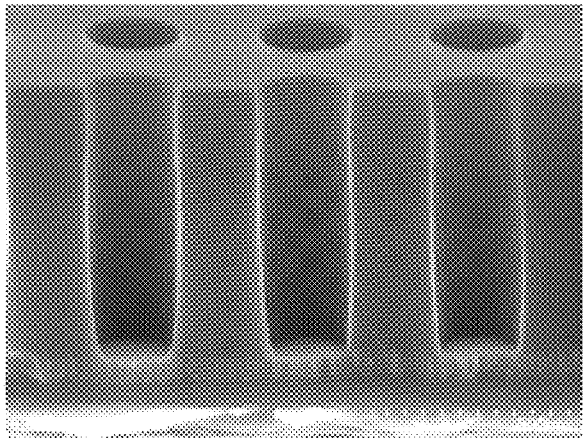
FIG. 3D is a scanning electron microscope image obtained after cleaning an oxide surface with the stripper composition according to Example 8 of the invention.
Figure 4A:
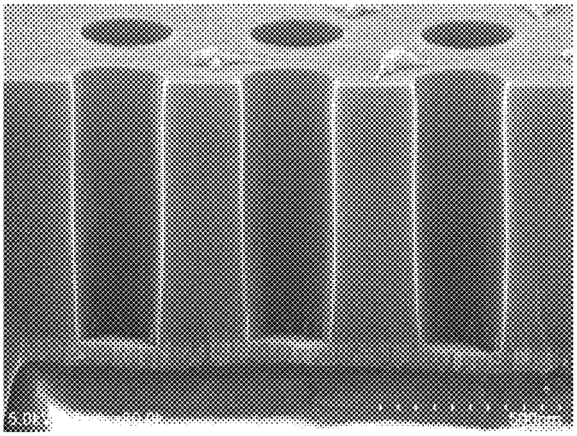
FIG. 4A is a scanning electron microscope image obtained after cleaning an oxide surface with the stripper composition according to Example 9 of the invention.
Figure 4B:
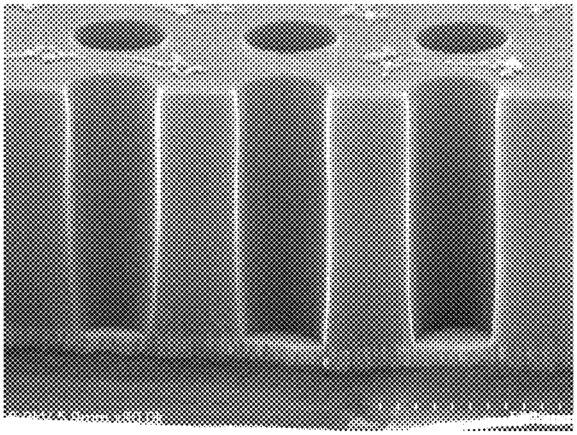
FIG. 4B is a scanning electron microscope image obtained after cleaning an oxide surface with the stripper composition according to Example 10 of the invention.
Figure 4C:
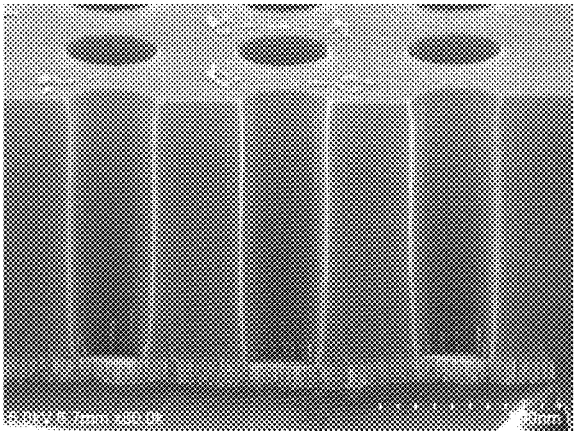
FIG. 4C is a scanning electron microscope image obtained after cleaning an oxide surface with the stripper composition according to Example 11 of the invention.
Figure 4D:
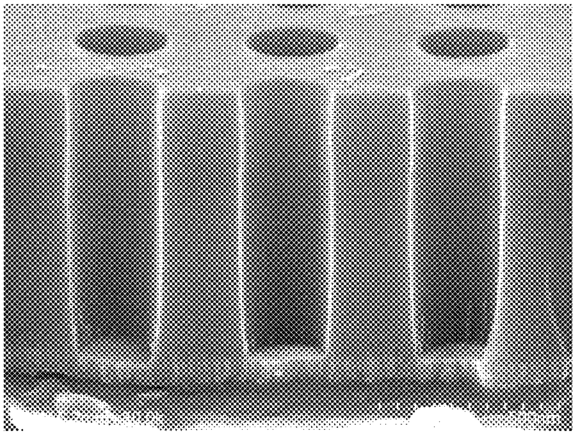
FIG. 4D is a scanning electron microscope image obtained after cleaning an oxide surface with the stripper composition according to Example 12 of the invention.
Figure 5A:
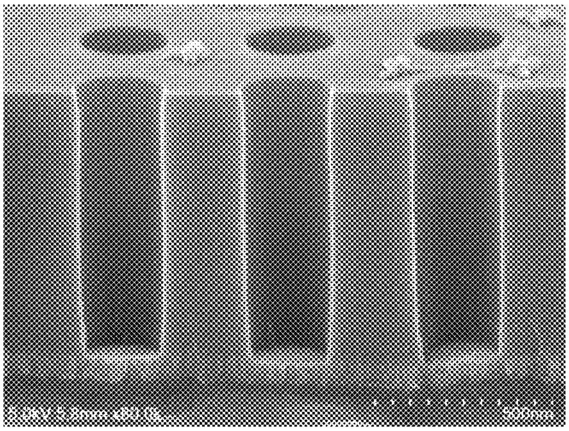
FIG. 5A is a scanning electron microscope image obtained after cleaning an oxide surface with the stripper composition according to Example 13 of the invention.
Figure 5B:
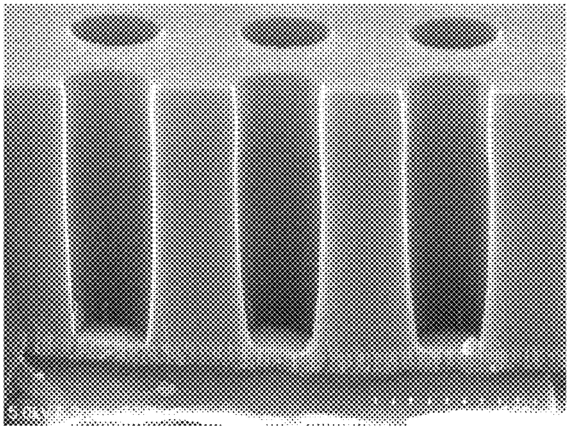
FIG. 5B is a scanning electron microscope image obtained after cleaning an oxide surface with the stripper composition according to Example 14 of the invention.
Figure 5C:
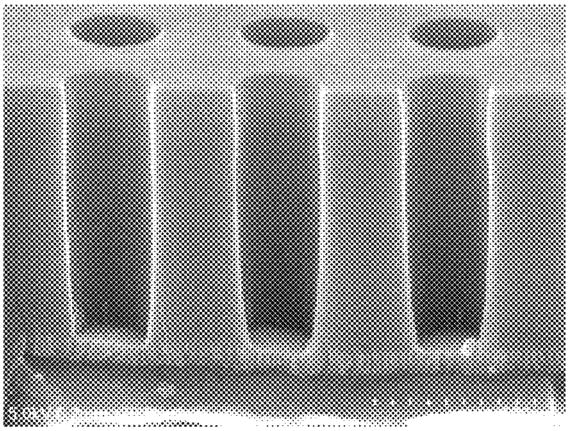
FIG. 5C is a scanning electron microscope image obtained after cleaning an oxide surface with the stripper composition according to Example 15 of the invention.
Figure 5D:
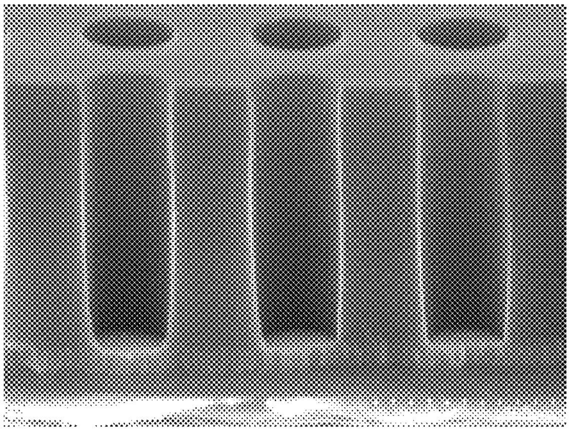
FIG. 5D is a scanning electron microscope image obtained after cleaning an oxide surface with the stripper composition according to Example 16 of the invention.

The invention provides a stripper composition including an amine-based compound (A), a fatty acid (B) and a solvent (C). In addition, the stripper composition of the invention may further include a quaternary ammonium compound (D). In the present embodiment, a pH value of the stripper composition is 10 or more, preferably 12 to 13. Hereinafter, the various components above are described in detail.

Amine-Based Compound (A)

The amine-based compound (A) is not particularly limited, and suitable amine-based compound (A) may be selected according to needs. In the present embodiment, the amine-based compound (A) may include an alcohol amine-based compound, an alcohol ether amine-based compound, an ether amine-based compound, or a combination thereof, preferably an alcohol amine-based compound. The alcohol amine-based compound may include monoethanolamine (MEA), aminoethylethanolamine (AEEA), N-methyl ethanol amine (NMEA), isopropanolamine or other suitable alcohol amine-based compounds, preferably monoethanolamine. The alcohol ether amine-based compound may include N,N-dimethylamino polyethylene glycol methyl ether ($(CH_3)_2N(CH_2CH_2O)_nCH_3$, wherein n being an integer from 1 to 4) or other suitable alcohol ether amine-based compounds, preferably N,N-dimethylamino ethylene glycol methyl ether ($(CH_3)_2N(CH_2CH_2O)_nCH_3$, n=1). The ether amine-based compound may include alkyl propyl ether amine or other suitable ether amine-based compounds, preferably alkyl propyl ether amine.

Based on a total usage amount of 100 wt % of the stripper composition, a usage amount of the amine-based compound (A) is 0.5 wt % to 55 wt %, preferably 10 wt % to 40 wt %. When the usage amount of the amine-based compound (A) is within the aforementioned range, the stripper composition used in a cleaning method cleans the oxide surface well. When the usage amount of the amine-based compound (A) is within the aforementioned preferable range, the stripper composition used in a cleaning method has better cleaning effect on the oxide surface.

Fatty Acid (B)

The fatty acid (B) is not particularly limited, and suitable fatty acid (B) may be selected according to needs. The fatty acid (B) may include a saturated fatty acid, an unsaturated fatty acid, or a combination thereof, preferably a saturated fatty acid. In the present embodiment, the fatty acid (B) may include hexanoic acid, octanoic acid, lauric acid, oleic acid, myristic acid, palmitic acid, decanoic acid, or a combination thereof, preferably hexanoic acid, octanoic acid, decanoic acid.

Based on a total usage amount of 100 wt % of the stripper composition, a usage amount of the fatty acid (B) is 0.1 wt % to 5 wt %, preferably 0.1 wt % to 1.5 wt %.

When the stripper composition includes the fatty acid (B), the stripper composition used in a cleaning method does not corrode the metal surface, and cleans the metal surface and the oxide surface well at the same time.

Solvent (C)

The solvent (C) is not particularly limited, and suitable solvent (C) may be selected according to needs. In the present embodiment, the solvent (C) may include water, an alcohol-based compound, an alcohol ether-based compound, or a combination thereof, preferably an alcohol-based compound, an alcohol ether-based compound, or a combination thereof. The alcohol-based compound may include ethylene glycol, propylene glycol, butylene glycol or other suitable alcohol-based compounds, preferably propylene glycol. The alcohol ether-based compound may include ethylene glycol monobutyl ether, propylene glycol monobutyl ether, butylene glycol monobutyl ether or other suitable alcohol ether-based compounds, preferably ethylene glycol monobutyl ether.

Based on a total usage amount of 100 wt % of the stripper composition, a usage amount of the solvent (C) is 60 wt % to 97 wt %, preferably 70 wt % to 85 wt %. Based on a total usage amount of 100 wt % of the stripper composition, a usage amount of a solvent in the solvent (C) except water is 60 wt % to 96 wt %, preferably 70 wt % to 85 wt %.

Based on a total usage amount of 100 wt % of the stripper composition, a usage amount of water is 1 wt % or less, preferably 0.1 wt % to 1 wt %. When the usage amount of water in the stripper composition is within the aforementioned range, the stripper composition used in a cleaning method does not corrode the metal surface, and cleans the metal surface and the oxide surface well at the same time.

Quaternary Ammonium Compound (D)

The quaternary ammonium compound (D) is not particularly limited, and suitable quaternary ammonium compound (D) may be selected according to needs. In the present embodiment, the quaternary ammonium compound (D) may include a quaternary ammonium hydroxide compound, a quaternary ammonium halide compound, or a combination thereof, preferably a quaternary ammonium hydroxide compound. The quaternary ammonium hydroxide compound may include tetramethylammonium hydroxide (TMAH), tetraethylammonium hydroxide (TEAH), ethyltrimethylammonium hydroxide, tetrabutylammonium hydroxide (TBAH), benzyltrimethylammonium hydroxide or other suitable quaternary ammonium hydroxide compounds, preferably tetramethylammonium hydroxide. The quaternary ammonium halide compound may include tetramethylammonium chloride, tetrabutylammonium bromide or other suitable quaternary ammonium halide compounds.

Based on a total usage amount of 100 wt % of the stripper composition, a usage amount of the quaternary ammonium compound (D) is 0.5 wt % to 15 wt %, preferably 2 wt % to 8 wt %. When the usage amount of the quaternary ammonium compound (D) is within the aforementioned range, the stripper composition used in a cleaning method has better cleaning effect on the oxide surface.

A ratio of a usage amount of the quaternary ammonium compound (D) to a usage amount of the amine-based compound (A) is 1:1 to 1:20, preferably 1:3 to 1:8, more preferably 1:5 to 1:7. When a ratio of a usage amount of the quaternary ammonium compound (D) to a usage amount of the amine-based compound (A) is within the aforementioned range, the stripper composition used in a cleaning method cleans the oxide surface well. When a ratio of a usage amount of the quaternary ammonium compound (D) to a usage amount of the amine-based compound (A) is within the aforementioned preferable range, the stripper composition used in a cleaning method has better cleaning effect on the oxide surface.

<Preparation Method of Stripper Composition>

The preparation method of the stripper composition is not particularly limited. For example, the amine-based compound (A), the fatty acid (B) and the solvent (C) were placed in a stirrer and stirred to be uniformly mixed into a solution state. If needed, the quaternary ammonium compound (D) may also be added, and after mixing uniformly, a stripper composition was obtained.

<Cleaning Method>

An exemplary embodiment of the invention provides a cleaning method, which includes using the stripper composition above to clean and remove a residue or film adhering on a metal surface and/or an oxide surface. The cleaning method is not particularly limited, and for example, a known cleaning method may be used. For example, the cleaning method may include immersion cleaning, spray cleaning or other suitable cleaning methods.

The material of the metal surface is not particularly limited, and suitable metal material may be selected according to needs. For example, the metal material may include aluminum, titanium, copper or other suitable metal materials.

The oxide is not particularly limited, and suitable oxide may be selected according to needs. For example, the oxide may include silicon oxide, silicon oxycarbide, hafnium oxide or other suitable oxides.

Hereinafter, the invention is described in detail with reference to examples. The following examples are provided to describe the invention, and the scope of the invention includes the scope in the following patent application and its substitutes and modifications, and is not limited to the scope of the examples.

Examples of Stripper Composition and Cleaning Method

Example 1 to Example 16 and Comparative example 1 to Comparative example 2 of the stripper composition and its use in cleaning method are described below:

Example 1

14.93 wt % of monoethanolamine, 0.50 wt % of octanoic acid, and 4.98 wt % of tetramethylammonium hydroxide were added to 78.81 wt % of propylene glycol and 0.80 wt % of water, and after stirring uniformly with a stirrer, the stripper composition of Example 1 was obtained. The obtained stripper composition was measured pH value by the following method, and the result thereof is as shown in Table 1. In addition, after using it to clean the metal surface, the corrosion resistance was evaluated by the following evaluation method, and the result is as shown in Table 1.

Example 2 to Example 4 and Comparative Example 1 to Comparative Example 2

The stripper compositions of Example 2 to Example 4 and Comparative example 1 to Comparative example 2 were prepared using the same steps as Example 1, and the difference thereof is: the usage amount of the components of the stripper compositions were changed (as shown in Table 1). The obtained stripper compositions were measured pH value by the following method, and the results thereof are as shown in Table 1. In addition, after using it to clean the metal surface, the corrosion resistance was evaluated by the following evaluation method, and the results are as shown in Table 1.

TABLE 1

| Component | | Examples | | | | Comparative examples | |
|---|---|---|---|---|---|---|---|
| (unit: wt %) | | 1 | 2 | 3 | 4 | 1 | 2 |
| Amine-based compound (A) | Monoethanol-amine | 14.93 | 14.56 | 14.29 | 20.00 | 15.00 | 20.00 |
| Fatty acid (B) | Octanoic acid | 0.50 | 2.91 | 4.76 | 1.00 | — | 1.00 |
| Solvent (C) | Propylene glycol | 78.81 | 76.89 | 75.43 | 73.20 | 79.20 | 69.00 |
| | Water | 0.80 | 0.78 | 0.76 | 0.80 | 0.80 | 5.00 |
| Quaternary ammonium compound (D) | Tetramethyl-ammonium hydroxide | 4.98 | 4.85 | 4.76 | 5.00 | 5.00 | 5.00 |
| Evaluation results | pH value | 12.3 | 12.3 | 12.3 | 12.4 | 12.4 | 12.4 |
| | corrosion resistance | ○ | ○ | ○ | ○ | X | X |

Example 5 to Example 16

The stripper compositions of Example 5 to Example 16 were prepared using the same steps as Example 1, and the difference thereof is: the usage amount of the components of the stripper compositions were changed (as shown in Table 2). The obtained stripper compositions were measured pH value by the following method, and the results thereof are as shown in Table 2. In addition, after using it to clean the silicon oxide surface, the removal property was evaluated by the following evaluation method, and the results are as shown in Table 2.

TABLE 2

| Component | | Examples | | | | | | | |
|---|---|---|---|---|---|---|---|---|---|
| (unit: wt %) | | 5 | 6 | 7 | 8 | 9 | 10 | 11 | 12 |
| Amine-based compound (A) | Mono-ethanol-amine | 15.00 | 14.42 | 14.02 | 13.64 | 4.76 | 13.04 | 23.08 | 33.33 |
| Fatty acid (B) | Octanoic acid | 1.50 | 1.44 | 1.40 | 1.36 | 1.43 | 1.30 | 1.15 | 1.00 |

TABLE 2-continued

| | | | | | | | | | |
|---|---|---|---|---|---|---|---|---|---|
| Solvent (C) | Propylene glycol | 82.70 | 79.52 | 77.29 | 75.18 | 88.29 | 80.61 | 71.31 | 61.80 |
| | Water | 0.80 | 0.77 | 0.75 | 0.73 | 0.76 | 0.70 | 0.62 | 0.53 |
| Quaternary ammonium compound (D) | Tetramethyl-ammonium hydroxide | — | 3.85 | 6.54 | 9.09 | 4.76 | 4.35 | 3.85 | 3.33 |
| Evaluation results | pH value | 10.2 | 12.3 | 12.3 | 12.3 | 12.3 | 12.3 | 12.3 | 12.3 |
| | Removal property | Δ | Δ | ○ | ○ | Δ | Δ | Δ | ○ |

| Component | | Examples | | | |
|---|---|---|---|---|---|
| (unit: wt %) | | 13 | 14 | 15 | 16 |
| Amine-based compound (A) | Mono-ethanol-amine | 0.98 | 12.71 | 22.22 | 27.40 |
| Fatty acid (B) | Octanoic acid | 1.47 | 1.27 | 1.11 | 1.03 |
| Solvent (C) | Propylene glycol | 95.78 | 82.80 | 72.37 | 66.92 |
| | Water | 0.78 | 0.68 | 0.59 | 0.55 |
| Quaternary ammonium compound (D) | Tetramethyl-ammonium hydroxide | 0.98 | 2.54 | 3.70 | 4.11 |
| Quaternary ammonium compound (D):Amine-based compound (A) | | 1:1 | 3:15 | 5:30 | 6:40 |
| Evaluation results | pH value | 12.3 | 12.3 | 12.3 | 12.3 |
| | Removal property | Δ | Δ | ○ | ○ |

<Evaluation Methods> a. pH Value

The prepared stripper composition was dissolved in water to make a solution with a concentration of 5%. The PH value of the solution was measured via a PH meter.

b. Corrosion Resistance

The aluminum-copper metal circuit chip was soaked in the stripping composition for 30 minutes at a temperature of 75° C. Next, the metal profile was observed via a scanning electron microscope (SEM)(Model: 8200, manufactured by HITACH Co., Ltd.). When the metal surface is not corroded by the stripper composition, the stripper composition has good anti-corrosion effect on the metal surface, that is, good corrosion resistance.

The evaluation criteria of corrosion resistance are as follows:

○: the metal surface is not corroded by the stripper composition;

X: the metal surface is corroded by the stripper composition.

c. Removal Property

Figure 6A:
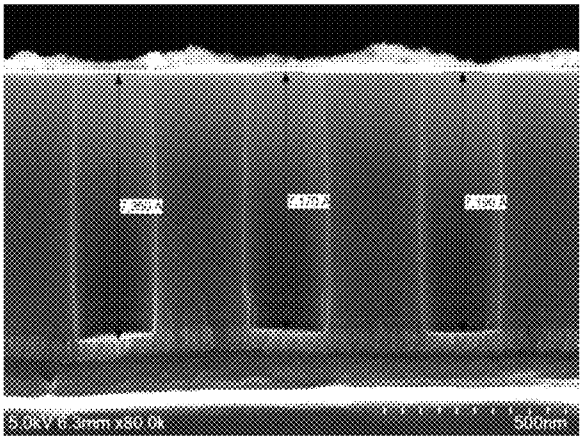
FIG. 6A and FIG. 6B are scanning electron microscope images of a metal surface and an oxide surface before cleaning with the stripper composition.
Figure 6B:
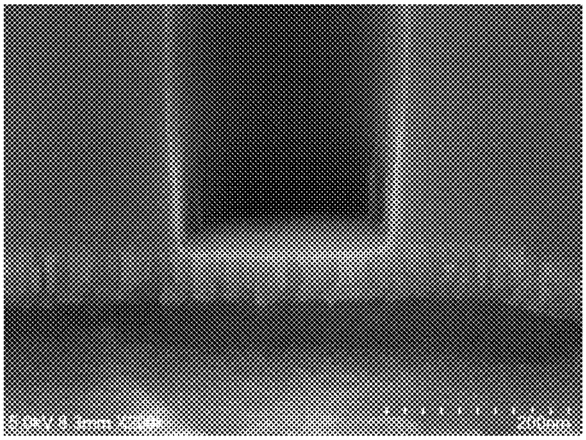

The silicon oxide dielectric circuit chip was soaked in the stripping composition for 30 minutes at a temperature of 75° C. Next, the silicon oxide surface was observed via a scanning electron microscope (Model: 8200, manufactured by HITACH Co., Ltd.). When compared with the surface observed before soaking in the stripper composition (FIG. 6A and FIG. 6B), the observed residue on the silicon oxide surface after soaking in the stripper composition is less, the stripper composition has good surface cleaning effect, that is, good removal property.

The evaluation criteria of removal property are as follows:

○: the residue is almost not observed or observed a very small amount on the silicon oxide surface;

Δ: the residue is obviously observed on the silicon oxide surface;

X: the amount of residue on the silicon oxide surface is similar to that observed on the surface before soaking in the stripper composition.

<Evaluation Results>

As may be seen from Table 1, FIG. 1A to FIG. 1D and FIG. 2A to FIG. 2B, when the stripper composition includes an amine-based compound (A), a fatty acid (B) and a solvent (C), and based on a total usage amount of 100 wt % of the stripper composition, a usage amount of water is 1 wt % or less (Examples 1 to 4), the stripper composition used to clean the metal surface may have good anti-corrosion effect on the metal surface, that is, good corrosion resistance, and may be suitable for manufacturing a semiconductor device. On the other hand, when the stripper composition does not include the fatty acid (B) or based on a total usage amount of 100 wt % of the stripper composition, a usage amount of water is more than 1 wt % (Comparative examples 1 to 2), the stripper composition used to clean the metal surface may corrode the metal surface. The stripper composition of the invention has good corrosion resistance at a temperature of 65° C., 75° C. or 85° C., and only shows the image at a temperature of 75° C. herein.

As may be seen from Table 2, FIG. 3A to FIG. 3D, FIG. 4A to FIG. 4D and FIG. 5A to FIG. 5D, when the stripper composition includes an amine-based compound (A), a fatty acid (B) and a solvent (C), and based on a total usage amount of 100 wt % of the stripper composition, a usage amount of water is 1 wt % or less (Examples 5 to 16), the stripper composition used to clean the silicon oxide surface may have good surface cleaning effect, that is, good removal property, and may be suitable for manufacturing a semiconductor device. The stripper composition of the invention has good removal property at a temperature of 65° C., 75° C. or 85° C., and only shows the image at a temperature of 75° C. herein.

In addition, compared to the stripper composition including 0 wt % to 4 wt % of the quaternary ammonium compound (D) (Examples 5 to 6), the stripper composition including 6 wt % to 10 wt % of the quaternary ammonium compound (D) (Examples 7 to 8) used to clean the silicon oxide surface may have better surface cleaning effect, that is, better removal property.

In addition, compared to the stripper composition including 4 wt % to 14 wt % of the amine-based compound (A) (Examples 9 to 10), the stripper composition including 23 wt % to 34 wt % of the amine-based compound (A) (Examples 11 to 12) used to clean the silicon oxide surface may have better surface cleaning effect, that is, better removal property. More preferably, the stripper composition including 33 wt % to 34 wt % of the amine-based compound (A) is used to clean the silicon oxide surface.

In addition, compared to the stripper composition for which a ratio of a usage amount of the quaternary ammonium compound (D) to a usage amount of the amine-based compound (A) is 1:1 to 1:20 (Example 13), the stripper composition for which a ratio of a usage amount of the quaternary ammonium compound (D) to a usage amount of the amine-based compound (A) is 1:5 to 1:7 (Examples 14 to 16) used to clean the silicon oxide surface may have better surface cleaning effect, that is, better removal property.

Based on the above, when the stripper composition of the invention includes the amine-based compound (A), the fatty acid (B) and the solvent (C), and based on a total usage amount of 100 wt % of the stripper composition, a usage amount of water is 1 wt % or less, the stripper composition used for surface cleaning may clean the metal surface and the oxide surface well without corroding the metal surface to have good corrosion resistance and removal property, thereby suitable for manufacturing a semiconductor device. In addition, the stripper composition of the invention has good corrosion resistance and removal property at a temperature of 65° C. to 85° C., thereby suitable for manufacturing a semiconductor device.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A stripper composition, comprising:

an amine-based compound (A), wherein the amine-based compound (A) comprises an alcohol amine-based compound, an alcohol ether amine-based compound, an ether amine-based compound, or a combination thereof;

a fatty acid (B), wherein the fatty acid (B) comprises hexanoic acid, octanoic acid, lauric acid, oleic acid, myristic acid, palmitic acid, decanoic acid, or a combination thereof;

a solvent (C), wherein the solvent (C) comprises an alcohol-based compound, an alcohol ether-based compound, or a combination thereof; and a quaternary ammonium compound (D), wherein the quaternary ammonium compound (D) comprises a quaternary ammonium hydroxide compound, a quaternary ammonium halide compound, or a combination thereof;

wherein based on a total usage amount of 100 wt % of the stripper composition, a usage amount of water is 0.53 wt % to 0.80 wt %, wherein a weight ratio of a usage amount of the quaternary ammonium compound (D) to a usage amount of the amine-based compound (A) is 1:3 to 1:20.

2. The stripper composition according to claim 1, wherein based on a total usage amount of 100 wt % of the stripper composition, the usage amount of the amine-based compound (A) is 0.5 wt % to 55 wt %.

3. The stripper composition according to claim 1, wherein based on a total usage amount of 100 wt % of the stripper composition, the usage amount of the quaternary ammonium compound (D) is 0.5 wt % to 15 wt %.

4. The stripper composition according to claim 1, wherein based on a total usage amount of 100 wt % of the stripper composition, a usage amount of the fatty acid (B) is 0.1 wt % to 5 wt %, a usage amount of the solvent (C) is 60 wt % to 97 wt %.

5. The stripper composition according to claim 1, wherein the composition has a pH value of 10 or more.

6. A cleaning method, comprising:

using the stripper composition according to claim 1 to clean and remove a residue or film adhering on a metal surface and/or an oxide surface by contacting the metal surface and/or the oxide surface with the stripper composition.

* * * * *